(12) United States Patent
Springett

(10) Patent No.: US 12,009,674 B2
(45) Date of Patent: Jun. 11, 2024

(54) WIRELESS POWER TRANSMISSION WITH MODULAR OUTPUT

(71) Applicant: PULS GmbH, Munich (DE)

(72) Inventor: Nigel Springett, Emmendingen (DE)

(73) Assignee: PULS GmbH, Munich (DE)

( * ) Notice: Subject to any disclaimer, the term of this patent is extended or adjusted under 35 U.S.C. 154(b) by 0 days.

(21) Appl. No.: 17/120,078

(22) Filed: Dec. 11, 2020

(65) Prior Publication Data

US 2021/0184501 A1  Jun. 17, 2021

(30) Foreign Application Priority Data

Dec. 13, 2019 (EP) ..................... 19216000

(51) Int. Cl.
*H02J 50/12* (2016.01)

(52) U.S. Cl.
CPC .......... *H02J 50/12* (2016.02); *H02J 2310/22* (2020.01)

(58) Field of Classification Search
None
See application file for complete search history.

(56) References Cited

U.S. PATENT DOCUMENTS

| | | | |
|---|---|---|---|
| 2008/0290738 A1 | 11/2008 | Greene et al. | |
| 2012/0161534 A1* | 6/2012 | Urano | H02J 50/12 307/104 |
| 2015/0326032 A1 | 11/2015 | Azancot et al. | |
| 2018/0006555 A1 | 1/2018 | Abu Qahouq | |
| 2018/0331576 A1* | 11/2018 | Kikuchi | H02J 50/05 |

(Continued)

FOREIGN PATENT DOCUMENTS

| | | |
|---|---|---|
| EP | 2 490 318 A1 | 8/2012 |
| EP | 3 463 971 A1 | 4/2019 |
| JP | H04-058764 A | 2/1992 |

(Continued)

OTHER PUBLICATIONS

Extended European Search Report dated Jul. 2, 2020 in connection with European Application No. 19216000.0.

*Primary Examiner* — Daniel Kessie
(74) *Attorney, Agent, or Firm* — Wolf, Greenfield & Sacks, P.C.

(57) ABSTRACT

Efficient measures to improve electrical performance in a mobile side output circuitry of a wireless power transmission system are provided. The mobile side circuitry of the wireless power transmission system has a mobile side transformer stage comprising at least one primary side winding and a plurality of secondary side windings. To the plurality of secondary side windings there are connected a plurality of mobile side AC/DC converters. According to a first alternative of the present invention output terminal pairs of the plurality of mobile side AC/DC converters are connected in series. According to a second alternative of the present invention output terminal pairs of the plurality of mobile side AC/DC converters are connected in parallel. According to a third alternative of the present invention mobile side AC/DC converters are grouped into a plurality of mobile side output groups such that output terminal pairs within each mobile side output group are connected in series and output terminal pairs of different mobile side output groups are connected in parallel.

6 Claims, 16 Drawing Sheets

(56) References Cited

U.S. PATENT DOCUMENTS

2019/0006836 A1 1/2019 Danilovic et al.
2020/0313571 A1* 10/2020 Andersson ................ H02J 3/36

FOREIGN PATENT DOCUMENTS

| JP | 2006-179456 A | 7/2006 |
|---|---|---|
| JP | 2014-017281 A | 1/2014 |
| JP | 2015-070787 A | 4/2015 |
| JP | 2016-134965 A | 7/2016 |
| WO | WO 2017/105256 A1 | 6/2017 |
| WO | WO 2017/210170 A1 | 12/2017 |

* cited by examiner

WIRELESS POWER TRANSMISSION WITH MODULAR OUTPUT

CROSS REFERENCE TO RELATED APPLICATION

This application claims priority to European patent application number 19216000.0, filed Dec. 13, 2019, the contents of which is incorporated herein by reference in its entirety.

FIELD OF INVENTION

The present invention relates to a wireless power transmission system, and in particular to the provision of a modular output structure at a mobile side of a wireless power transmission system, to the measurement of an output current of the modular output structure, and to a control method for a synchronous rectifier operated at the mobile side of the wireless power transfer system.

BACKGROUND ART

Generally, wireless power transfer systems have a number of advantages over conductive power transmission systems. E.g., for electric vehicles it means that a plug in of a cable is no longer required.

FIG. 1 shows a schematic diagram of a wireless power transmission system 100 as known in the art.

As shown in FIG. 1, a wireless power transmission system 100 comprises at a stationary side a DC/AC converter 102, a stationary side controller 104, a stationary side compensation capacitor 106, and a transmitter coil 108 connected in series to the stationary side compensation capacitor 106. The series connection of the stationary side compensation capacitor 106 and the transmitter coil 108 is connected to the output side of the DC/AC converter 102.

As shown in FIG. 1, the wireless power transmission system 100 comprises at a mobile side a receiver coil 110 connected in series to a mobile side compensation capacitor 112. The series connection of the receiver coil 110 and the mobile side compensation capacitor 112 is connected to an input side of an AC/DC converter 114 which is operated under control of a mobile side controller 116. Parallel to the series connection of the receiver coil 110 and the mobile side compensation capacitor 112 there may connected a transformer 118 to improve galvanic decoupling. At the output of the AC/DC converter 114 there is connected a load 118. For the connection of the load 118 there may be provided a DC/DC converter for control of the power level delivered to the load 118 (not shown in FIG. 1).

As shown in FIG. 1, a wireless communication link 122 may be established from the mobile side to the stationary side for exchange of control data and/or measurement data between from the mobile side to the stationary side.

Operatively, the DC/AC converter 102 is adapted to receive a DC input signal and adapted to convert it into a stationary side AC signal. The stationary side AC signal is output to the series connection of the stationary side compensation capacitor 106 and the transmitter coil 108 for generation of an oscillating magnetic field. The stationary side controller 104 is adapted to measure the characteristics of the stationary side AC signal and optionally the DC input signal for control of the DC/AC converter 102. In more detail, the stationary side controller 104 is adapted to control the DC/AC converter 102 such that the generated magnetic field oscillates at resonant frequency of the series connection of the stationary side compensation capacitor 106 and the transmitter coil 108.

Operatively, the receiver coil 110, when placed in the magnetic field produced by the transmitter coil 108, receives energy transmitted by the transmitter coil 108 through inductive coupling. The inductive coupling leads to the generation of a mobile side AC signal. Under control of the mobile side controller 116 the AC/DC converter 114 is adapted to convert the mobile side AC signal into a load side DC signal which is then forwarded to the load 118.

Operatively, the mobile side controller 116 is adapted to measure the mobile side AC signal and optionally the load side DC signal for control of a power delivered to the load 118. Operatively, measurement data and control data may be sent over the wireless communication link 120 to improve the control and to inform the stationary side on fault conditions at the mobile side.

Generally, the cables to coils in the wireless power transmission system 100 as described above are operated at the power transfer frequency and carry significant voltage and power. Further, at the mobile side of the wireless power transmission system 100 the output current flows through the mobile side compensation capacitor 112 and rectifier elements of the AC/DC converter 114. Thus, as the current increases also losses increase leading to a degrading electrical performance.

SUMMARY OF INVENTION

In view of the above, the object of the present invention is to provide efficient ways to improve electrical performance in a mobile side output circuitry of a wireless power transmission system.

According to a first aspect of the present invention this object is achieved by a mobile side circuitry of a wireless power transmission system. The mobile side circuitry of the wireless power transmission system comprises a mobile side resonant circuit adapted to inductively couple the mobile side circuitry to a stationary side circuitry of the wireless power transmission system, a mobile side rectifier stage adapted to rectify an input signal for supply of power to a mobile side load, and a mobile side transformer stage connected at its input side to the mobile side resonant circuit and connected at its output side to the mobile side rectifier stage. Further, the mobile side transformer stage comprises at least one primary side winding and a plurality of secondary side windings and the mobile side rectifier stage comprises a plurality of mobile side AC/DC converters each connected to one of the plurality secondary side windings. According to the first aspect of the present invention output terminal pairs of the plurality of mobile side AC/DC converters are connected in series or output terminal pairs of the plurality of mobile side AC/DC converters are connected in parallel or mobile side AC/DC converters are grouped into a plurality of mobile side output groups such that output terminal pairs within each mobile side output group are connected in series and output terminal pairs of different mobile side output groups are connected in parallel.

According to a second aspect of the present invention the object outlined above is achieved by use of a current transformer for evaluation of an output current of a wireless power transfer system. According to the second aspect the current transformer has a primary side winding connected to an input of a mobile side circuitry of a wireless power transmission system and a secondary side winding connected to a monitoring circuit adapted to evaluate the output current of a wireless power transfer system.

According to a third aspect of the present invention the object outlined above is achieved by a monitoring circuit for determining an output current of a wireless power transfer system. The monitoring circuit comprises a current transformer having a primary side winding and a secondary side winding, wherein the primary side winding is connected to an input of a mobile side circuitry of a wireless power transmission system. The monitoring circuit further comprises a rectifying circuit connected to the secondary side winding. According to the third aspect the monitoring circuit further comprises an averaging circuit connected to the rectifying circuit and adapted to determine an average of the output of the rectifying circuit as equivalent to the output current of the wireless power transmission system.

According to a fourth aspect of the present invention the object outlined above is achieved by a controller for controlling at least one synchronous AC/DC converter operated in a mobile side circuitry of a wireless power transmission system comprising a signal processing unit and a control processing unit. According to the fourth aspect of the present invention the signal processing unit is adapted to receive an output signal of a current transformer having a primary side winding connected to an input of the mobile side circuitry of the wireless power transmission system, to classify a polarity of the output signal with respect to a reference potential as positive polarity or negative polarity, and to compare the output signal with a threshold value. Further, according to the fourth aspect of the present invention the control processing unit is adapted to turn on at least one first switching circuit of the at least one synchronous AC/DC converter when the output signal has positive polarity and the absolute value of the output signal is larger than the threshold value. Otherwise, the control processing unit is adapted to turn on at least one second switching circuit of the at least one synchronous AC/DC converter being different from the at least one first circuit when the output signal has negative polarity and the absolute value of the output signal is larger than the threshold value.

According to a fifth aspect of the present invention the object outlined above is achieved by a method of controlling operation of at least one synchronous AC/DC converter operated in a mobile side circuitry of a wireless power transmission system. The method comprises the steps of receiving an output signal of a current transformer having a primary side winding connected to an input of the mobile side circuitry a wireless power transmission system, of classifying a polarity of the output signal with respect to a reference potential as positive polarity or negative polarity, and of comparing the output signal with a threshold value. The method of controlling operation of at least one synchronous AC/DC converter further comprises the steps of turning on at least one first switching circuit of the at least one synchronous AC/DC converter when the output signal has positive polarity and an absolute value of the output signal is larger than the threshold value and of turning on at least one second switching circuit of the at least one synchronous AC/DC converter being different from the at least one first switching circuit when the output signal has negative polarity and the absolute value of the output signal is larger than threshold value.

DESCRIPTION OF DRAWING

In the following different aspects and examples of the present invention will be explained with reference to the drawing in which.

DETAILED DESCRIPTION OF INVENTION

Figure 1:
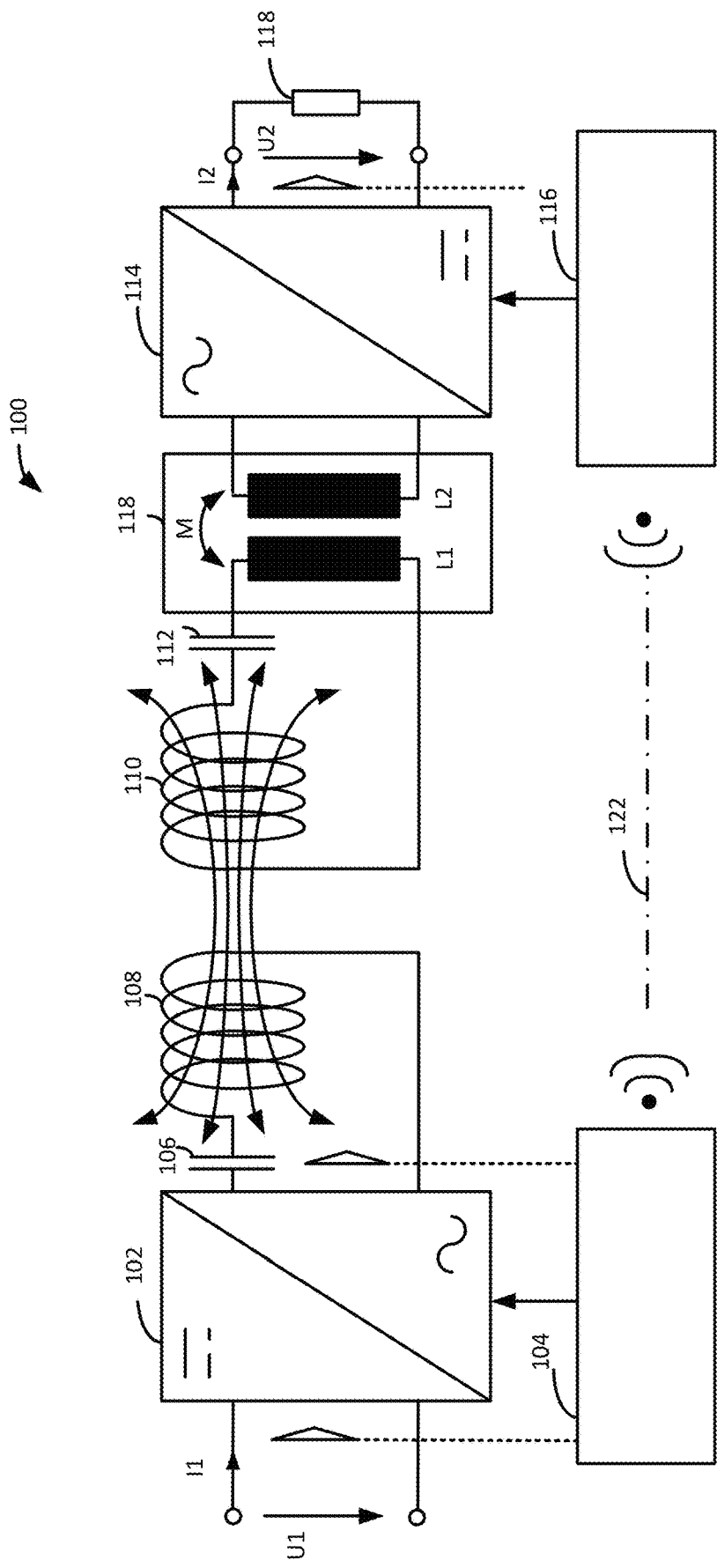
FIG. 1 shows a schematic circuit diagram of a wireless power transmission system as known in the art.

In the following the present invention will be explained in detail with reference to the drawing. Here, it should be understood that such explanation is related to examples of the present invention only and not binding to the scope of the present invention as defined by the claims. As far as reference is made to specific circuit components this is to be considered as example for the underlying functionality such the circuit components are clearly exchangeable as long as the same functionality is achieved.

Figure 2:
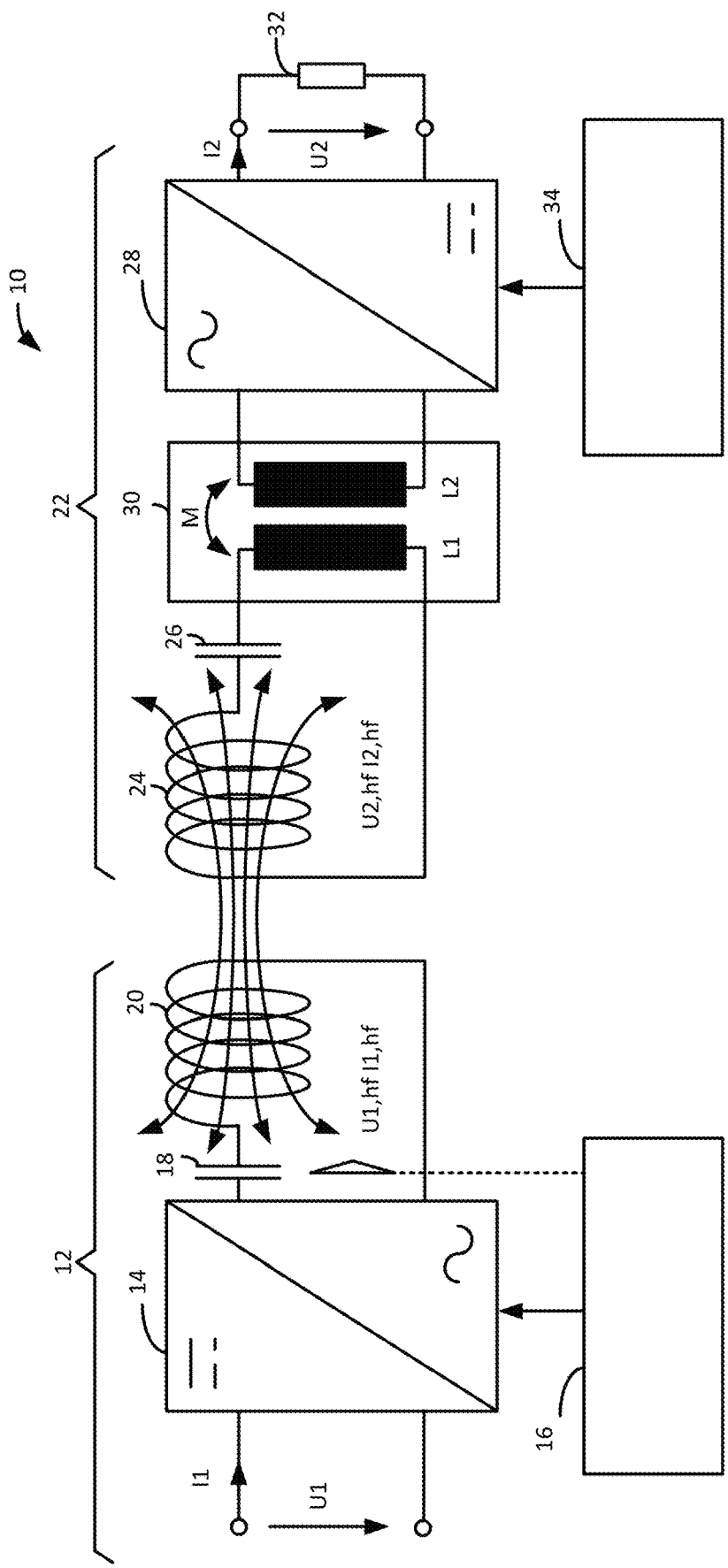
FIG. 2 shows a schematic circuit diagram of a wireless power transmission system explained for an understanding of the present invention.

FIG. 2 shows a schematic diagram of a wireless power transmission system 10 explained for an understanding of the present invention.

As shown in FIG. 2, the wireless power transfer system 10 has a transmission unit 12 at the stationary side. The transmission unit 12 comprises a stationary side DC/AC converter 14, a stationary side controller 16, a stationary side compensation capacitor 18, and a transmitter coil 20 connected in series to the stationary side compensation capacitor 18. The series connection of the stationary side compensation capacitor 18 and the transmitter coil 20 is connected to the output side of the stationary side DC/AC converter 14.

Operatively, the stationary side DC/AC converter 14 is adapted to receive a stationary side DC voltage $U_{1,dc}$ and a stationary side direct current $I_{1,dc}$ as input and to convert it into a stationary side high frequency voltage $U_{1,hf}$ and a stationary side high frequency current $I_{1,hf}$. The stationary side high frequency voltage $U_{1,hf}$ and the stationary side high frequency current $I_{1,hf}$ are then supplied to the series connection of the stationary side compensation capacitor 18 and transmitter coil 20 for generation of an oscillating magnetic field.

Operatively, the stationary side controller 16 is adapted to measure the stationary side high frequency current $I_{1,hf}$ and optionally the stationary side high frequency voltage $U_{1,hf}$, the stationary side direct current $I_{1,dc}$ and/or the stationary side dc voltage $U_{1,dc}$. The stationary side controller 16 is adapted to process a measurement result for control of the stationary side DC/AC converter 14. The stationary side DC/AC converter 14 is adapted to supply the stationary side high frequency voltage $U_{1,hf}$ and the stationary side high frequency current $I_{1,hf}$ to the series connection of the stationary side compensation capacitor 18 and the transmitter coil 20. The control of the stationary side controller 16 is such that the magnetic field generated by the transmitter coil 20 oscillates at resonant frequency of the series connection of the stationary side compensation capacitor 18 and the transmitter coil 20.

As shown in FIG. 2, the wireless power transmission system 10 also has at least one receiving unit 22 separated from the transmission unit 12.

As shown in FIG. 2, the receiving unit 22 comprises a receiver coil 24 connected in series to a mobile side compensation capacitor 26. The receiving unit 22 further comprises a mobile side AC/DC converter 28. At an input side of the mobile side AC/DC converter 28 there is connected a mobile side transformer stage 30 which at the input side is connected to the series connection of the receiver coil 24 and the mobile side compensation capacitor 26. At it the output side the transformer stage 30 is connected to the mobile side converter 28. Further, at the output side of the mobile side converter 28 there is connected a load 32. The receiving unit 22 comprises a mobile side controller 34 adapted to control the mobile side AC/DC converter 28.

Operatively, the receiver coil 24, when placed in the magnetic field produced by the transmitter coil 20, receives energy transmitted by the transmitter coil 20 through inductive coupling. The inductive coupling leads to generation of a mobile side high frequency voltage $U_{2,hf}$ and a mobile side high frequency current $I_{2,hf}$.

Operatively, the mobile side AC/DC converter 28 is adapted to convert the mobile side high frequency voltage $U_{2,hf}$ and the mobile side high frequency current $I_{2,hf}$ after transformation through the mobile side transformer 30 into a mobile side DC voltage $U_{2,dc}$ and a mobile side direct current $I_{2,dc}$ under control of the mobile side controller 34.

Operatively, the output transformer stage 30 is adapted to reduce the currents flowing in the receiver coil 24 and the mobile side compensation capacitor 26 while the current in the mobile side AC/DC converter 28 remains the output current o the load 32.

Operatively, the mobile side controller 34 is adapted to optionally measure the mobile side high frequency current $I_{2,hf}$ and to optionally measure the mobile side high frequency voltage $U_{2,hf}$, the mobile side direct current $I_{2,dc}$ and/or the mobile side DC voltage $U_{2,dc}$. The mobile side controller 34 is adapted to process a measurement result for controlling the mobile side AC/DC converter 28. The mobile side AC/DC converter 28 is adapted to supply of the mobile side DC voltage $U_{2,dc}$ and the mobile side direct current $I_{2,dc}$ to the load 32, e.g., either directly or via a DC/DC converter (not shown in FIG. 2).

Figure 3:
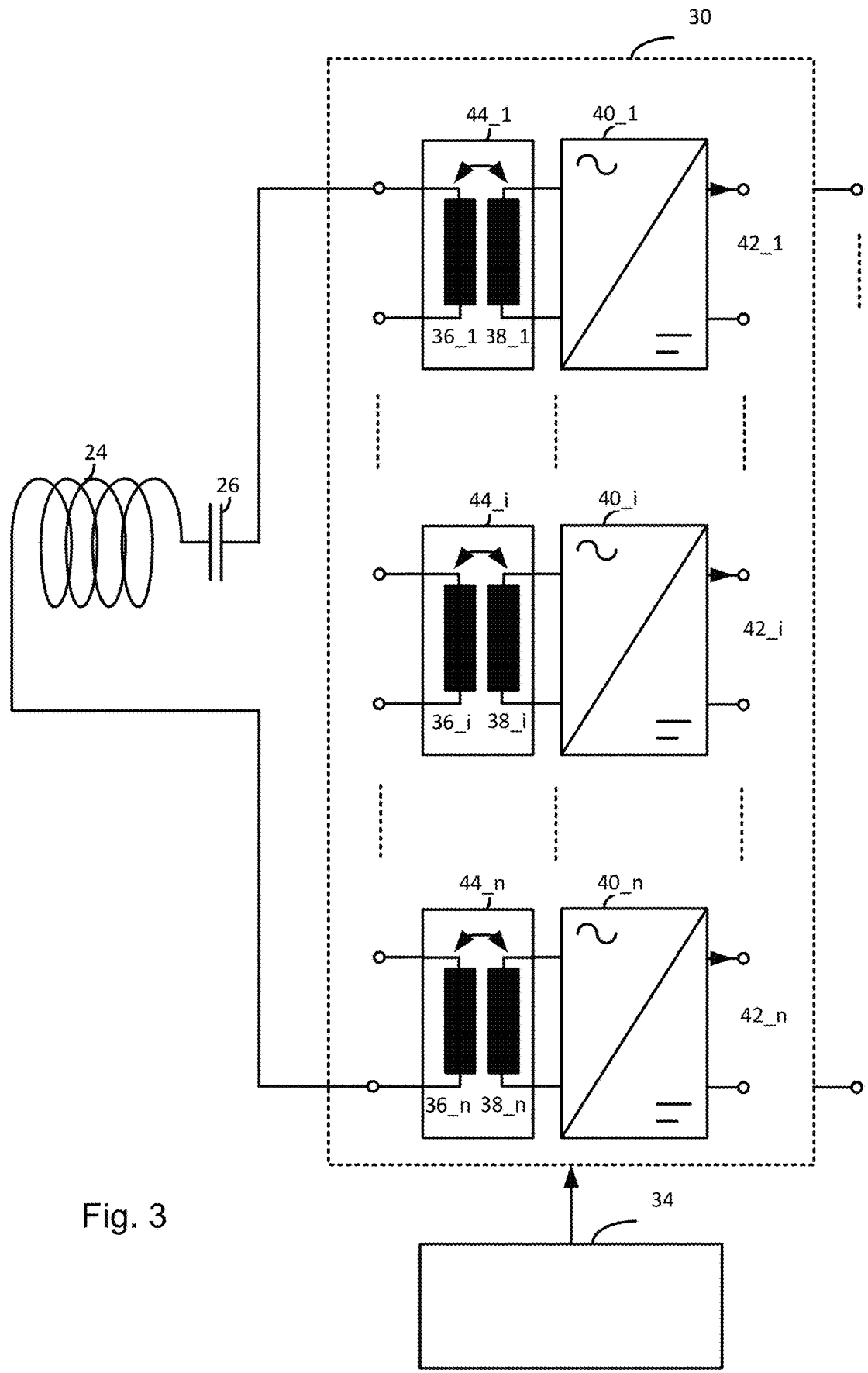
FIG. 3 shows a basic concept of the modular output circuit at the mobile side of the wireless power transfer system.

FIG. 3 shows a basic concept of the modular output circuit at the mobile side of the wireless power transfer system.

As shown in FIG. 3, according to the present invention the mobile side transformer stage 30 comprises at least one primary side winding 36_1, ..., 32_n and a plurality of secondary side windings 38_1, ..., 38_n. The mobile side rectifier stage 30 further comprises a plurality of mobile side AC/DC converters 40_1, ..., 40_n each connected to one of the plurality secondary side windings 38_1, ..., 38_n.

According to a first configuration alternative of the present invention the output terminal pairs 42_1, ..., 42_n of the plurality of the mobile side AC/DC converters may be connected in series.

According to a second configuration alternative of the present invention output terminal pairs 42_1, ..., 42_n of the plurality of mobile side AC/DC converters 40_1, ..., 40_n may be connected in parallel.

According to a third configuration alternative of the present invention mobile side AC/DC converters 40_1, ..., 40_n are grouped into a plurality of mobile side output groups such that output terminal pairs within each mobile side output group are connected in series and output terminal pairs of different mobile side output groups are connected in parallel.

In the most general sense and as will be explained in more detail in the following according to the present invention:
 the number of mobile side AC/DC converters 40_1, ..., 40_n is n>1;
 the number of mobile side output group(s) is g≥1;
 the number of mobile side AC/DC converter(s) per mobile side output group is 1≤r≤n;
 output terminal pairs of mobile side AC/DC converters in each mobile side output group are connected in series if r>1; and
 output terminal pairs of the mobile side output groups are connected in parallel if g>1.

As shown in FIG. 3, according to a first realization concept the modular output circuit the mobile side transformer stage 30 comprises a same number n of primary side windings 36_1, ..., 36_n and secondary side windings 38_1, ..., 38_n such that corresponding pairs of primary side windings 36_1, ..., 36_n and secondary side windings 36_1, ..., 36_n form transformer modules 44_1, ..., 44_n. It should be noted that transformer modules 44_1, ..., 44_n share a common transformer core (not shown in FIG. 3).

Figure 4:
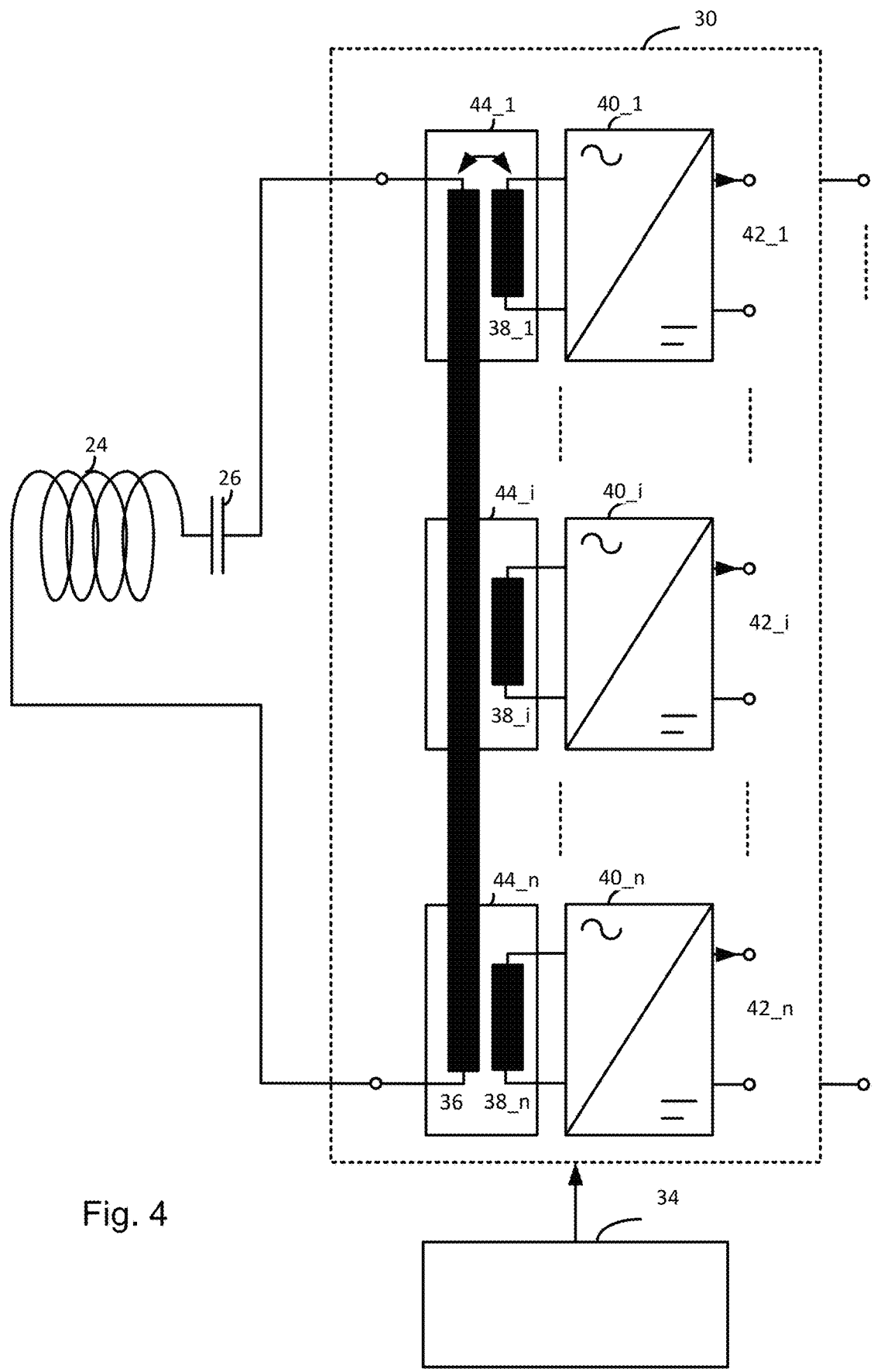
FIG. 4 shows a modification of the basic concept of the modular output circuit as shown in FIG. 3.

FIG. 4 shows a modification of the basic concept of the modular output circuit as shown in FIG. 3.

As shown in FIG. 4, according to a second realization concept the mobile side transformer stage 30 the mobile side circuit comprises one primary winding 36 being common to the plurality of secondary side windings 38_1, ..., 38_n. It should be noted that the one primary side winding 36 and the plurality of secondary side windings 38_1, ..., 38_n share a common transformer core (not shown in FIG. 4).

Operatively, an advantage of the second realization concept the mobile side transformer stage 30 shown in FIG. 4 is that occurrence of an unbalance between different primary side winding 36_1, ..., 36_n may be avoided.

Figure 5:
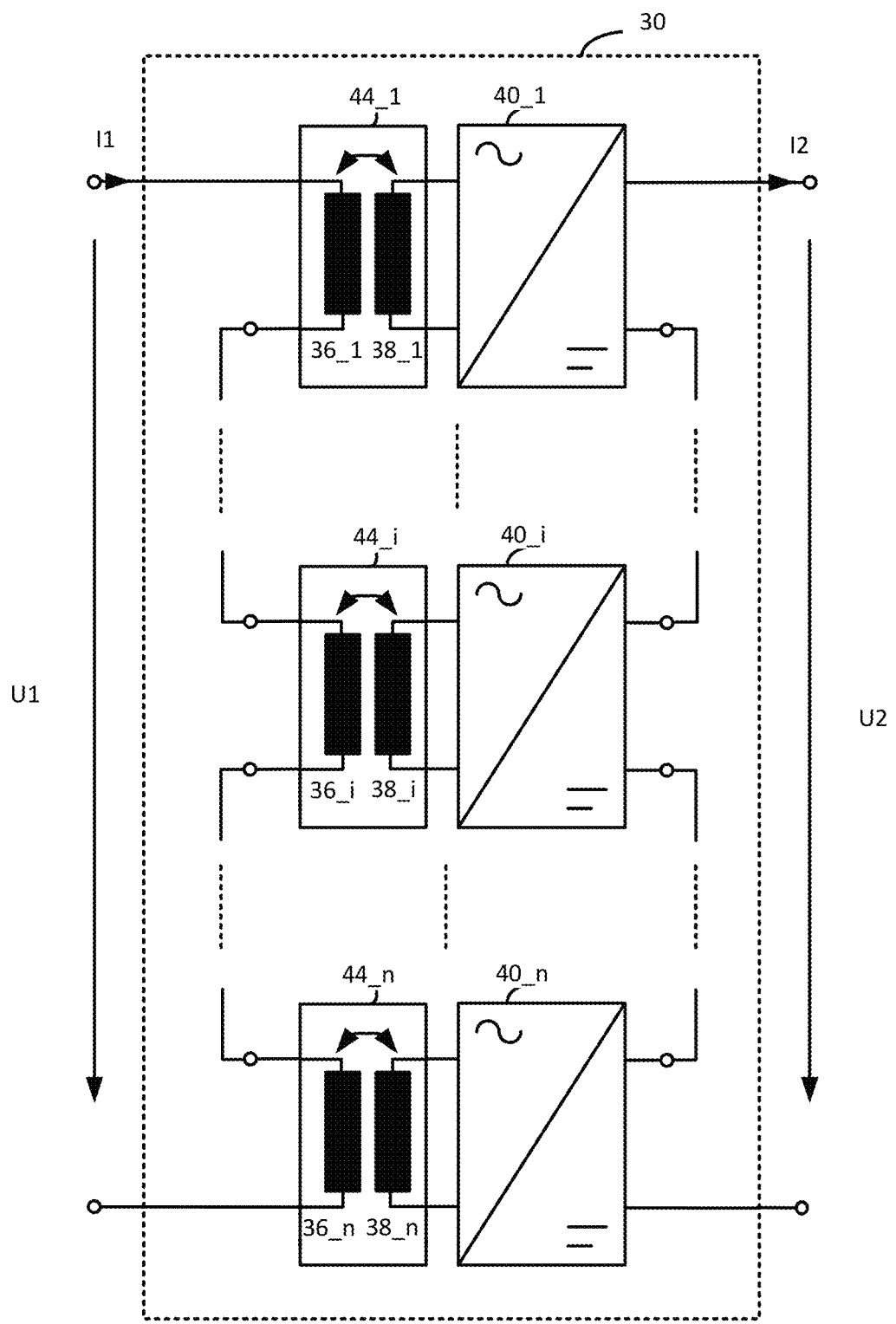
FIG. 5 shows a first series configuration of the modular output circuit shown in FIG. 3.

FIG. 5 shows a first series configuration of the modular output circuit 30 shown in FIG. 3.

As shown in FIG. 5, the input terminals of the plurality of transformer modules 44_1, ..., 44_n are connected in series.

As shown in FIG. 5, the output terminal pairs 42_1, ..., 42_n of the plurality of mobile side AC/DC converters 40_1, ..., 40_n are connected in series leading to an all series circuit configuration having one single output terminal group, g=1, which accommodates all rectifier circuits 40_1, ..., 40_n with n=r>1.

Operationally, each transformer module 44_1, ..., 44_n may be realized as ideal transformer having a transformer ratio ü:1. Further, assuming that the input voltage U1 is equally divided across the primary windings 36_1, ..., 36_n, at each primary winding 36_1, ..., 36_n there is applied a voltage U1/n which is transformed to U1/nü=U1/ü at the secondary side of each ideal transformer.

Assuming that also at the secondary side after rectification the related voltages are added due to series connection, then U2 may be approximately, n* U1/nü=U1/ü. In conclusion the series configuration of the modular output circuit 30 leads to a voltage level at the secondary side being modified according to the transformer ratio ü of the ideal transformer.

Further, operationally the current at the secondary side of each transformer module 44_1, ..., 44_n is I2=ü*I1. Due to the series connection a similar current will flow at the output side of ach mobile side AC/DC converters 40_1, ..., 40_n, e.g., a current of approximately ü*I1, however, being rectified. In conclusion the series configuration of the modular output circuit 30 leads to a current level in line with the transformer ratio of the ideal transformer.

Further, it should be noted that while operatively the overall power input into the series configuration of the modular output circuit 30 is transferred to the output side, nevertheless, the power to be handled by each combination of transformer module 44_1, ..., 44_n and mobile side AC/DC converters 40_1, ..., 40_n is reduced approximately by a factor of n. This is a significant advantage when higher levels of power have to be transferred to the load 32.

Figure 6:
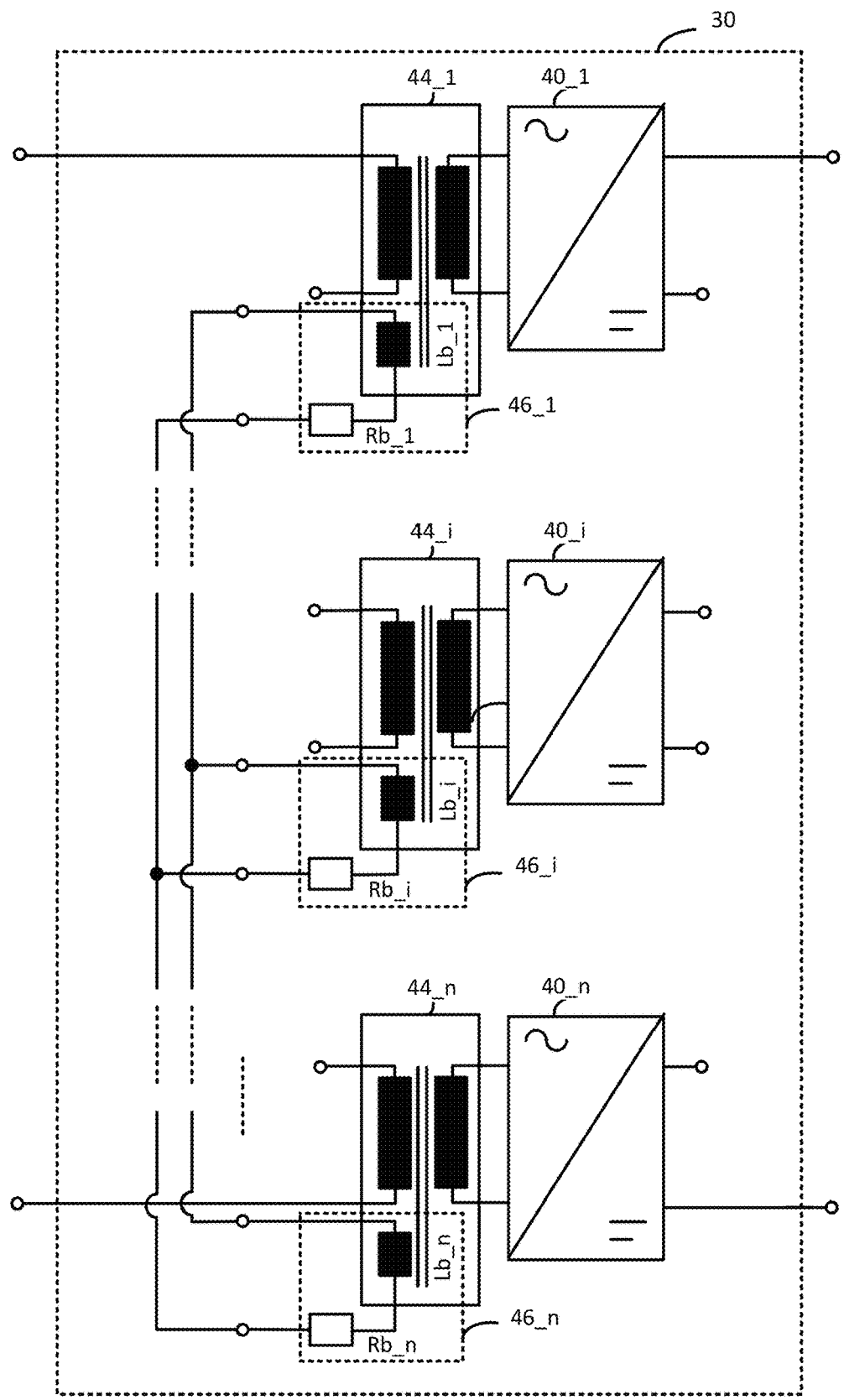
FIG. 6 shows the first series configuration as shown in FIG. 3 with balancing modules connected in parallel being added.

FIG. 6 shows the first series configuration of the modular output circuit as shown in FIG. 3 with a plurality of balancing modules 46_1, ..., 46_n connected in parallel being added.

As shown in FIG. 6, the plurality of balancing modules 46_1, ..., 46_n is respectively configured as series connection of a balancing winding Lb_1, Lb_n and a related balancing resistor Rb_1, Rb_n. Each balancing module 46_1, ..., 46_n is added to one transformer module 44_1, ..., 44_n and the balancing modules 46_1, ..., 46_n are connected in parallel.

Operatively, all transformer modules 44_1, ..., 44_n have the same primary current and therefore also the same output current but without the balancing modules 46_1, ..., 46_n nothing is defining the voltage across each transformer module 44_1, ..., 44_n. Thus, a small leakage current may create large voltage differences between transformer modules 44_1, ..., 44_n.

In view of this, balancing modules 46_1, ..., 46_n serve to keep similar voltages across different transformer modules 44_1, ..., 44_n. An extra balancing winding Lb_1, ..., Lb_n is added to each transformer module 44_1, ..., 44_n and the balancing windings Lb_1, Lb_n are connected in parallel through a related balancing resistor Rb_1, ..., Rb_n. If each balancing winding Lb_1, ..., Lb_n has a same voltage then no current will flow. However, if one voltage is different a balancing current will flow to keep voltages on a same level. The balancing resistors Rb_1, ..., Rb_n reduce circulating current in particular during switching transitions.

Figure 7:
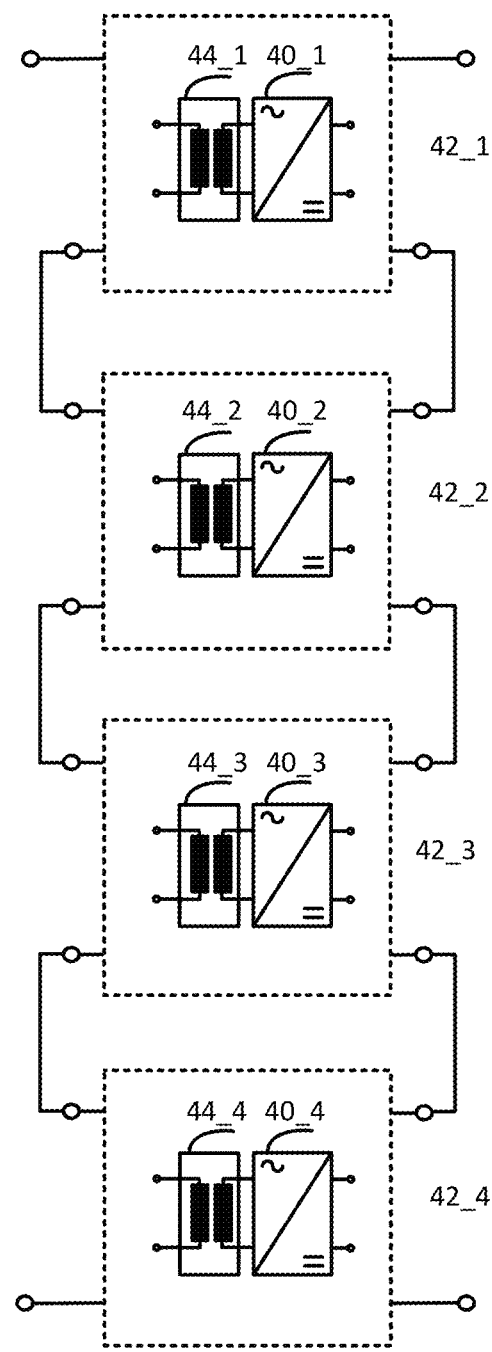
FIG. 7 shows an example of the first series configuration shown in FIG. 3 with four output terminal pairs connected in series.

FIG. 7 shows an example of the first series configuration shown in FIG. 3 with four output terminal pairs 42_1, ..., 42_4 connected in series.

As shown in FIG. 7, four output terminal pairs 42_1, ..., 42_4 of four mobile side AC/DC converters 40_1, ..., 40_4 are connected in series leading to an all series circuit configuration having one single output terminal group, g=1, which accommodates four mobile side AC/DC converters 40_1, ..., 40_4 with n=r=4.

Operatively, according to the explanations outlined above with respect to FIG. 5 in general, the series circuit configuration allows to reduce the thermal load to each combination of transformer module 44_1, ..., 44_4 and mobile side AC/DC converter 40_1, ..., 40_4 by a factor of four.

Figure 8:
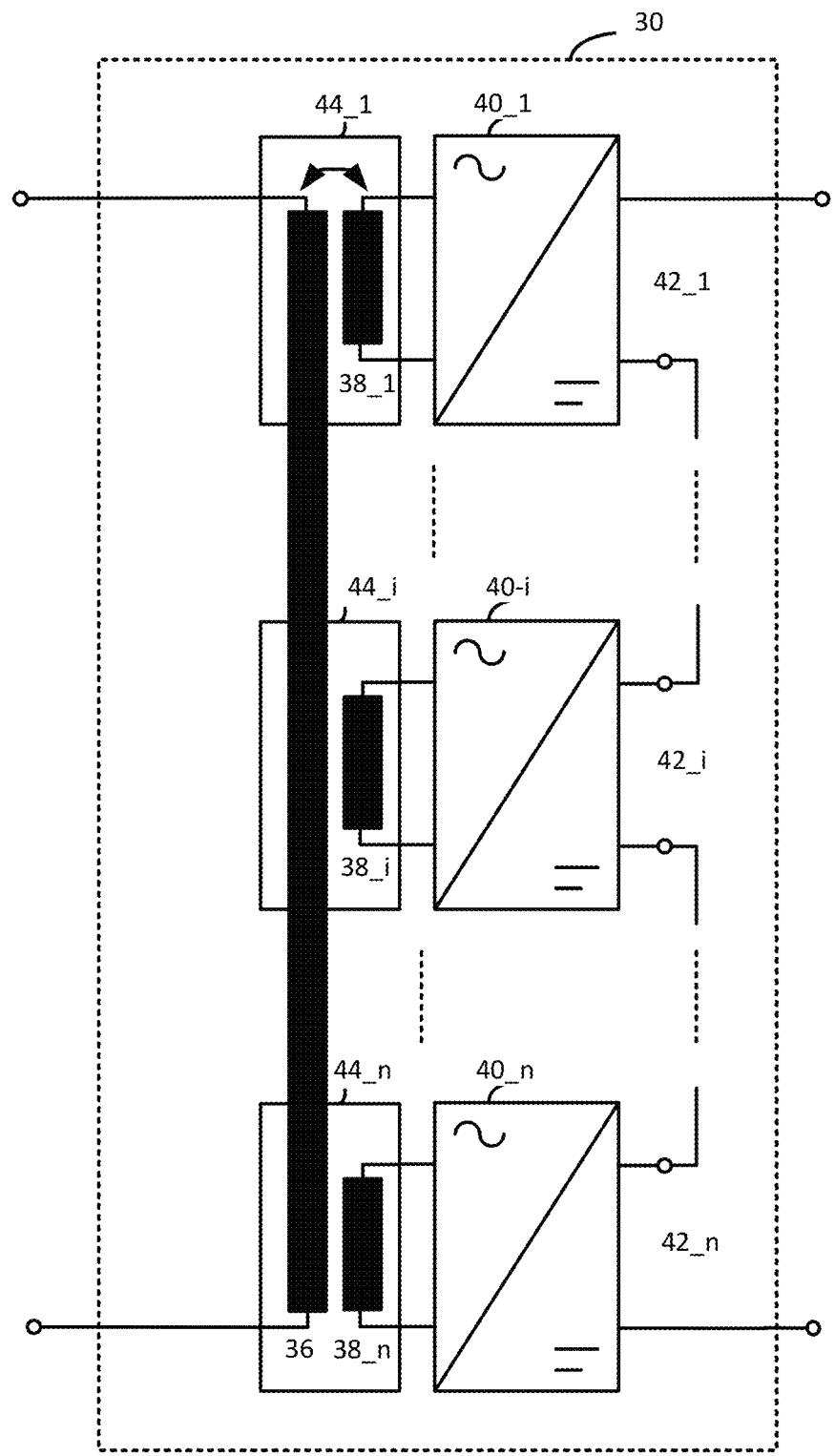
FIG. 8 shows a second series configuration of the modular output circuit shown in FIG. 3.

FIG. 8 shows an example of a second series configuration of the modular output circuit shown in FIG. 4.

As shown in FIG. 8, according to a second realization concept the mobile side transformer stage 30 of the mobile side circuit comprises one primary winding 36 being common to the plurality of secondary side windings 44_1, ..., 44_n. The output terminal pairs 42_1, ..., 42_n of the secondary side windings 44_1, ..., 44_n are connected in series.

It should be noted that the one primary side winding 36 and the plurality of secondary side windings 38_1, ..., 38_n may share a common transformer core (not shown in FIG. 8).

Operatively, the considerations outlined above with respect to FIG. 5 also apply to the second realization concept the mobile side transformer stage 30. An advantage of the second realization concept the mobile side transformer stage 30 over the first realization concept the mobile side transformer stage 30 shown in FIG. 5 and FIG. 6 is that there is no need to provide a balancing mechanism between the primary windings 36_1, ..., 36_n at the primary side.

Figure 9:
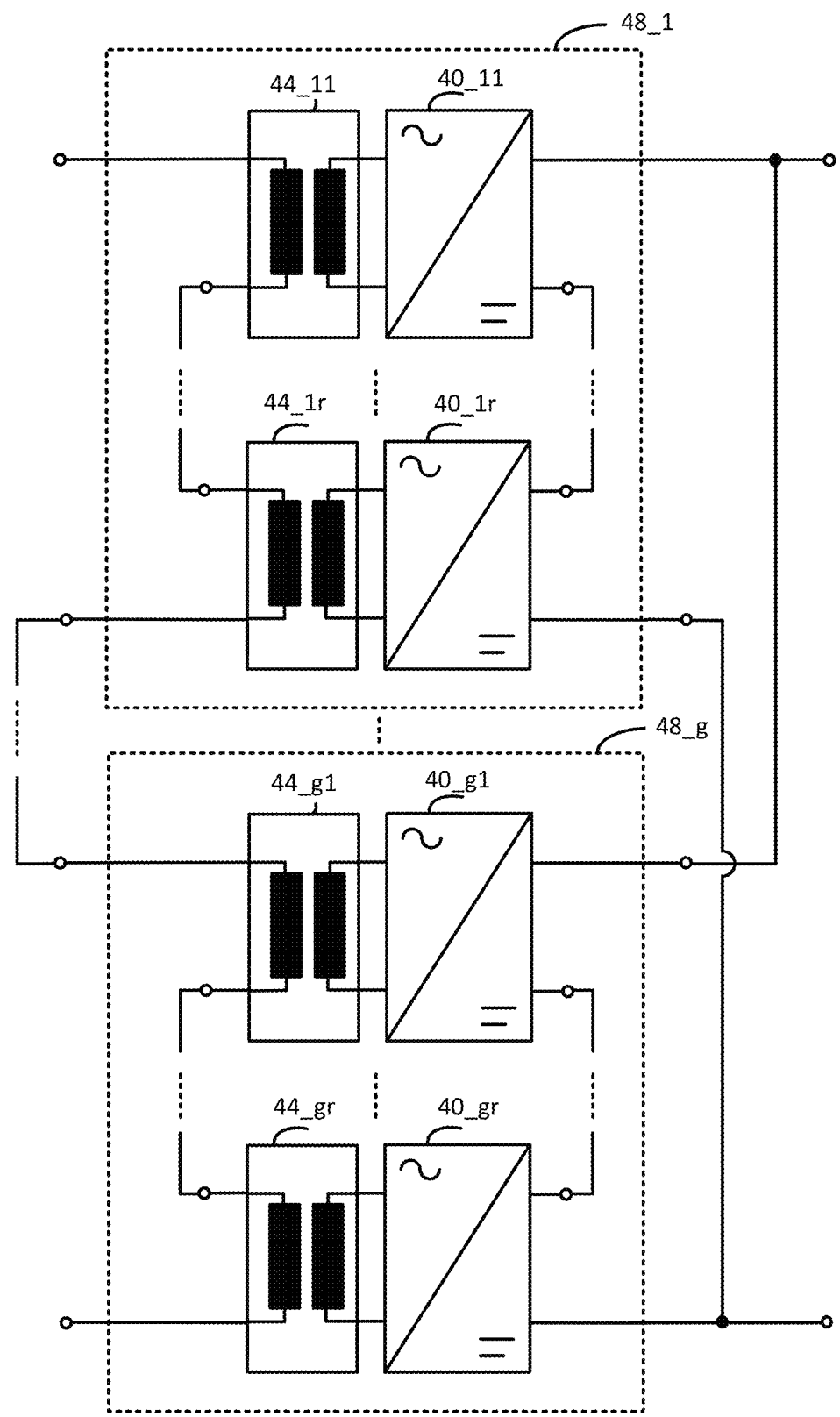
FIG. 9 shows a group configuration of the modular output circuit shown in FIG. 3 where rectifier circuits and related secondary side windings are grouped into mobile side output groups, output terminals of rectifier circuits within each mobile side output group are connected in series, and output terminal pairs of different mobile side output groups are connected in parallel.

FIG. 9 shows a group configuration of the modular output circuit shown in FIG. 3 where rectifier circuits and related mobile side windings are grouped, output terminals of rectifier circuits within each group are connected in series, and output terminal pairs of different groups are connected in parallel.

As shown in FIG. 9, according to the group configuration of the modular output circuit 30 generally there are set up g mobile side output groups 48_1, ..., 48_g, each comprising r transformer modules 44_11, ..., 44_1r, ..., 44_g1, ..., 44_gr and related mobile side AC/DC converters 40_11, ..., 40_1r, ..., 40_g1, ..., 40_gr.

As shown in FIG. 9, output terminal pairs within each mobile side output group 48_1, ..., 48_g are connected in series and output terminal pairs of different mobile side output groups 48_1, ..., 48_g are connected in parallel.

Here, assuming that the number of mobile side output groups 48_1, ..., 48_g is g, that the number of mobile side AC/DC converters is n, that the number of mobile side AC/DC converters per mobile side output group is r, and that each mobile side output group 48_1, ..., 48_g comprises a same number r of mobile side AC/DC converters, then 1<g<n, n mod g=0, r>1, and g*r=n applies.

Operatively, each transformer module 44_1, ..., 44_n may be realized by an ideal transformer having a transformer ration ü:1. Further, assuming that the input voltage U1 is equally divided across the g mobile side output groups 48_1, ..., 48_g and related primary windings, at each primary winding there is applied a voltage U1/n which is transformed to U1/nü at the secondary side of each ideal transformer.

Assuming that also at the secondary side the related voltages have to be added due to series connection, then the output voltage at each mobile side output group $48\_1, \ldots, 48\_g$ may be approximately, $r^* U1/n\ddot{u}=r^*U1/g^*r^*\ddot{u}=U1/g^*\ddot{u}$. In conclusion the group configuration of the modular output circuit 30 leads to a voltage level at the secondary side decreased by $r/n=r/g^*r=1/g$ when being compared to the series configuration of the modular output circuit 30 shown in FIG. 5.

Further, operationally the current at the secondary side of each transformer module $44\_1, \ldots, 44\_n$ is $I2=\ddot{u}^*I1$. Due to the parallel connection of the different mobile side output groups a superimposed current of $g^*\ddot{u}^*I1$ will flow at the output side of the group configuration of the modular output circuit 30, however, being rectified. In conclusion the group configuration of the modular output circuit 30 leads to a current level at the secondary side increased by a factor of g when being compared to the series configuration of the modular output circuit 30 shown in FIG. 5.

Further, it should be noted that while operatively the overall power input into the series configuration of the modular output circuit 30 is transferred to the output side, nevertheless, the power handed by each mobile side output group $48\_1, \ldots, 48\_g$ is a factor of $r/n=r/g^*r=1/g$ of the input power. This again reduces the load for each mobile side output group $48\_1$, to $48\_g$.

Figure 10:
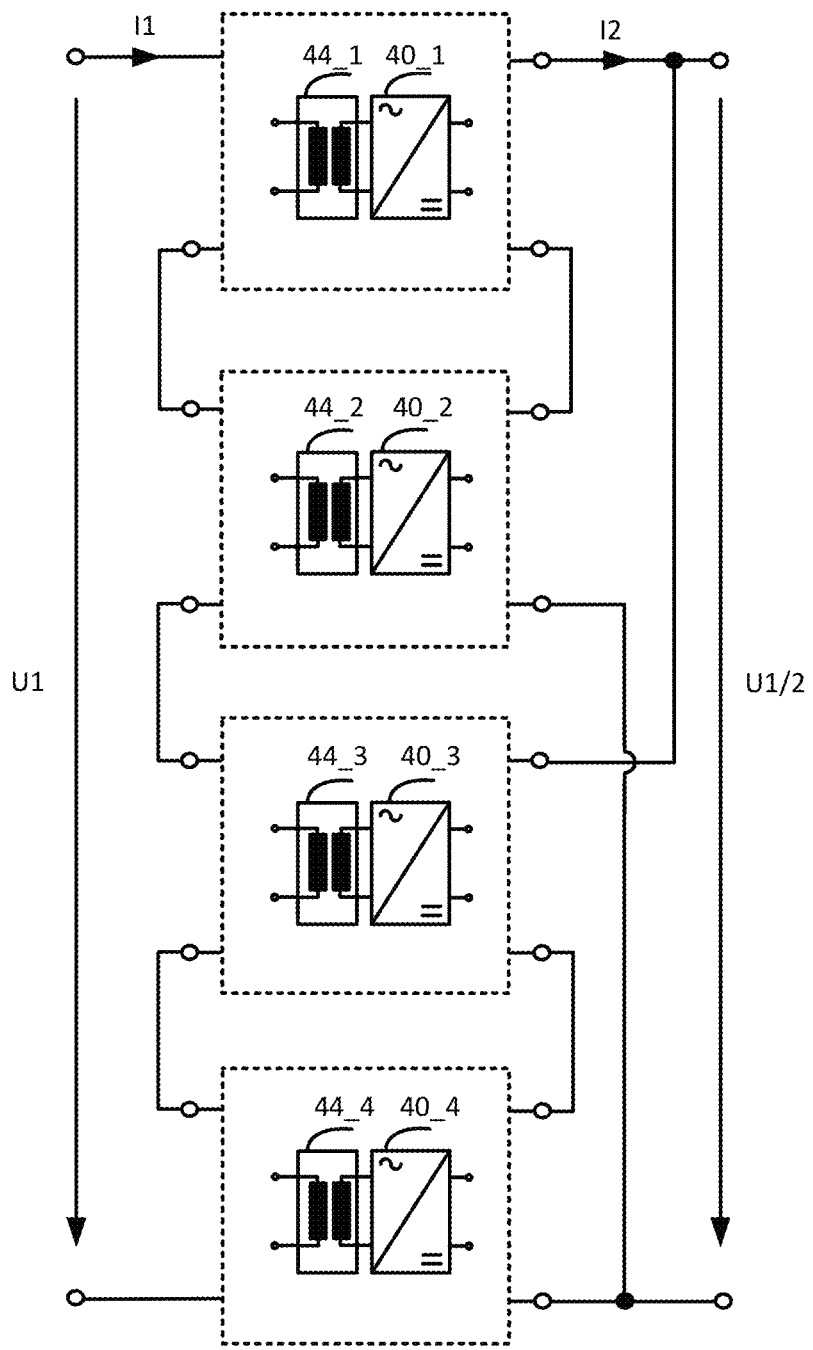
FIG. 10 shows an example of the group configuration shown in FIG. 9 where each mobile side output group has two transformer units as well as two mobile side AC/DC converters, respectively.

FIG. 10 shows an example of the group configuration shown in FIG. 9 where each mobile side group has two transformer units $44\_1, 44\_2$ and $44\_3, 44\_4$ as well as two mobile side AC/DC converters $40\_1, 40\_2$, ad $40\_3, 40\_4$, respectively.

Generally, assuming that the number n of mobile side AC/DC converters $40\_1, \ldots, 40\_4$ is a power of two $n=2^i$, $i=1, 2, 3, \ldots$, and that also the number of mobile side output groups is a power of two, then for the possible number of mobile side output groups $g=2^j$, $0 \le j \le i-1$ applies.

Figure 11:
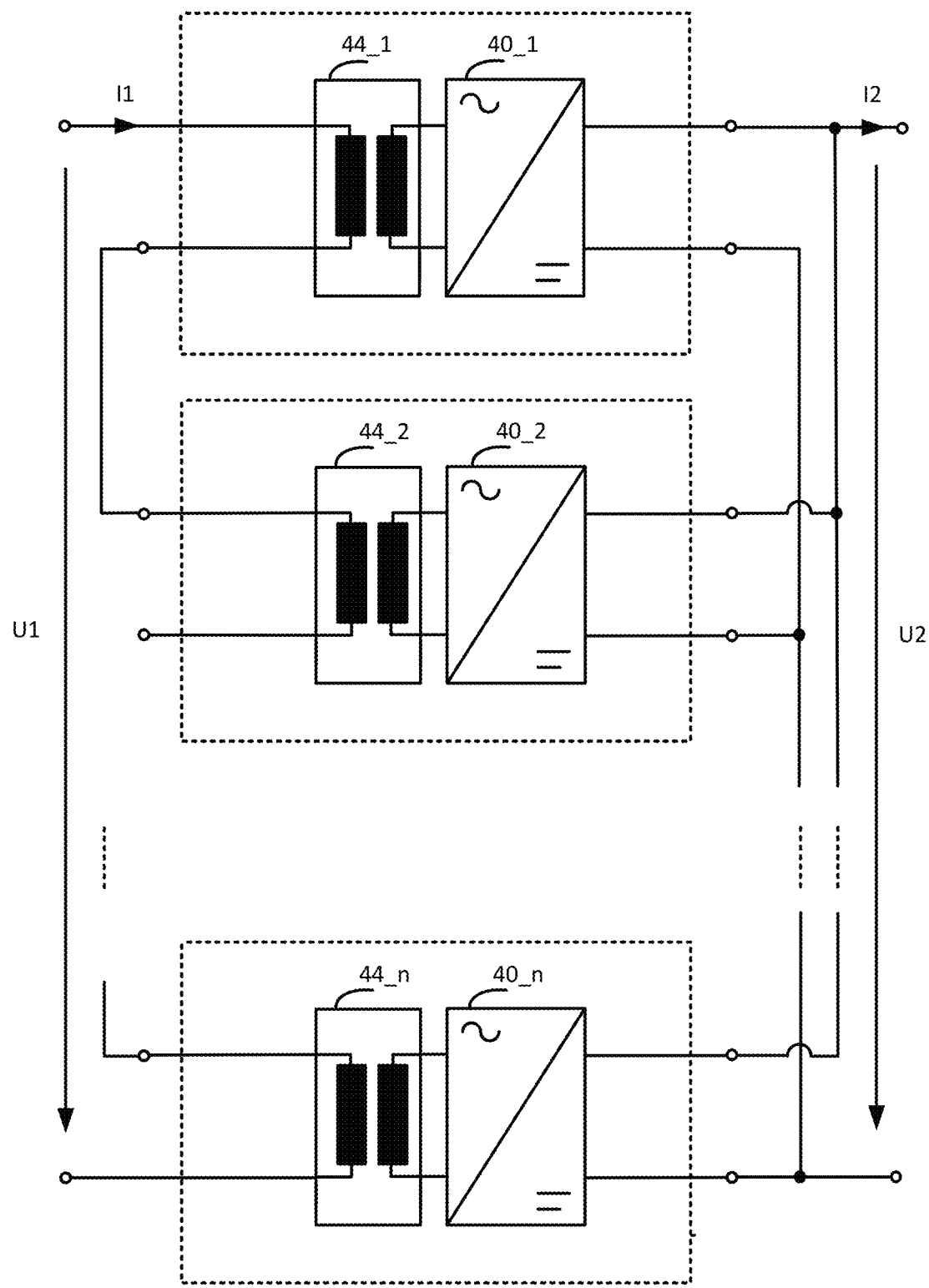
FIG. 11 shows a parallel configuration of the modular output circuit shown in FIG. 3.

FIG. 11 shows a parallel configuration of the modular output circuit shown in FIG. 3.

As shown in FIG. 11, according to the group configuration of the modular output circuit 30 generally there are set up g mobile side output groups $48\_1, \ldots, 48\_g$, each comprising one transformer module and one related mobile side AC/DC converter.

As shown in FIG. 11, output terminal pairs of the different mobile side output groups $48\_1, \ldots, 48\_g$ are connected in parallel.

Here, assuming that the number of mobile side AC/DC converters is n, that the number of mobile side AC/DC converters per mobile side output group is $r=1$, $g=n>1$ and $r=1$.

Operationally, each transformer module $44\_1, \ldots, 44\_n$ may be realized by an ideal transformer having a transformer ration ü:1. Further, assuming that the input voltage U1 is equally divided across the g mobile side output groups $48\_1, \ldots, 48\_g$ and related primary windings, at each primary winding there is applied a voltage U1/n which is transformed to U1/nü at the secondary side of each ideal transformer.

Also at the secondary side the related voltages are directly mapped to the output due to parallel connection and the output voltage is U1/nü. In conclusion the parallel configuration of the modular output circuit 30 leads to a voltage level at the secondary side decreased by 1/n when being compared to the series configuration of the modular output circuit 30 shown in FIG. 5.

Further, operationally the current at the secondary side of each transformer module $44\_1, \ldots, 44\_n$ is $I2=\ddot{u}^*I1$. Due to the parallel connection of the different mobile side AC/DC converters $40\_1, \ldots, 40\_n$ a superimposed current of $n^*\ddot{u}^*I1$ will flow at the output side of the parallel configuration of the modular output circuit 30, however, being rectified. In conclusion the parallel configuration of the modular output circuit 30 leads to a current level at the secondary side increased by a factor of n when being compared to the series configuration of the modular output circuit 30 shown in FIG. 5.

Further, it should be noted that while operatively the overall power input into the series configuration of the modular output circuit 30 is transferred to the output side, nevertheless, the power handed by each mobile side output group $48\_1, \ldots, 48\_g$ is a factor of 1/n of the input power. This again reduces the load for each mobile side output group $48\_1$, to $48\_g$.

Figure 12:
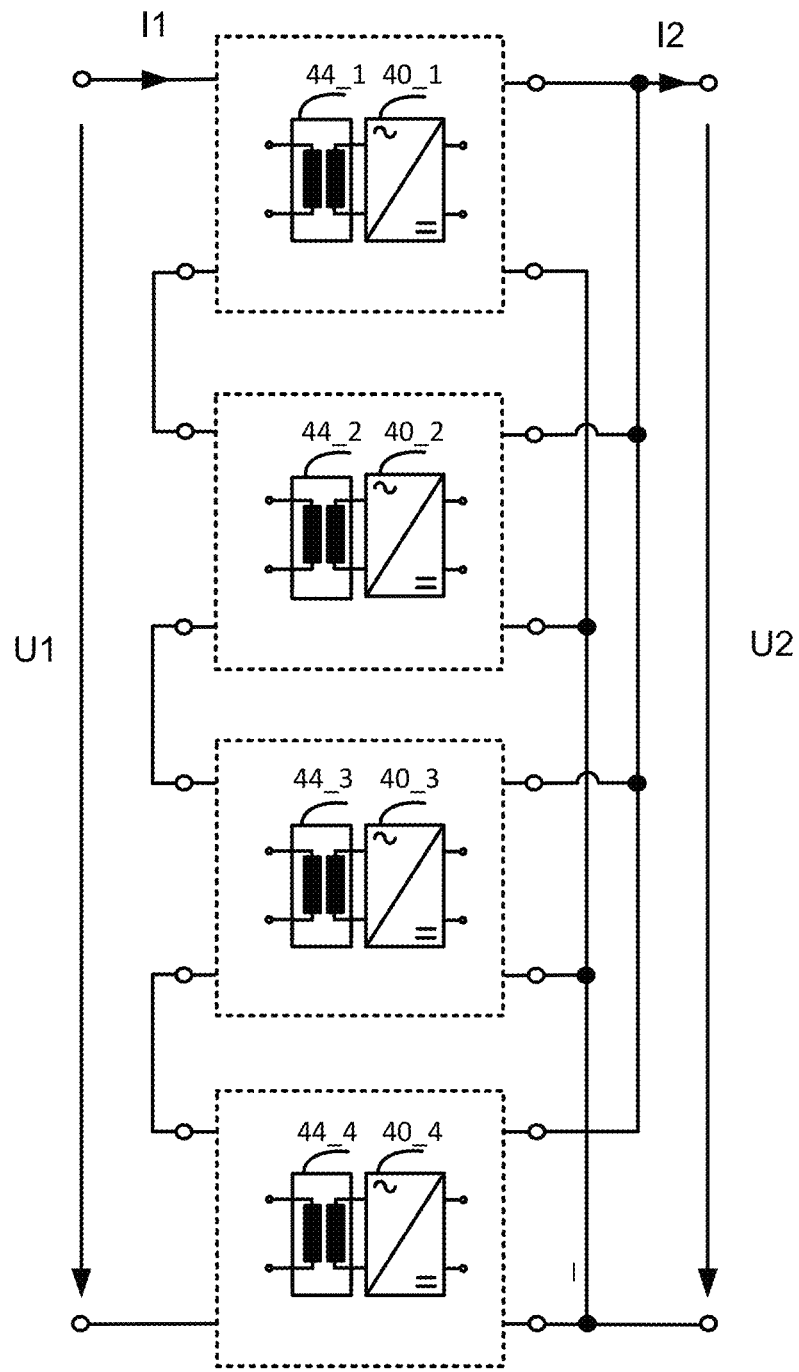
FIG. 12 shows an example of the parallel configuration shown in FIG. 11 with four output terminal pairs connected in parallel.

FIG. 12 shows an example of the parallel configuration shown in FIG. 11 with four output terminal pairs connected in parallel.

For the specific example shown in FIG. 12, assuming that, e.g., ü=1 then U2=U1/4 and I2=4*I1 applies. Further, each pair of transformer module $44\_1, \ldots, 44\_4$ and mobile side AC/DC converters $40\_1, \ldots, 40\_4$ handles ¼ of the input power.

Figure 13:
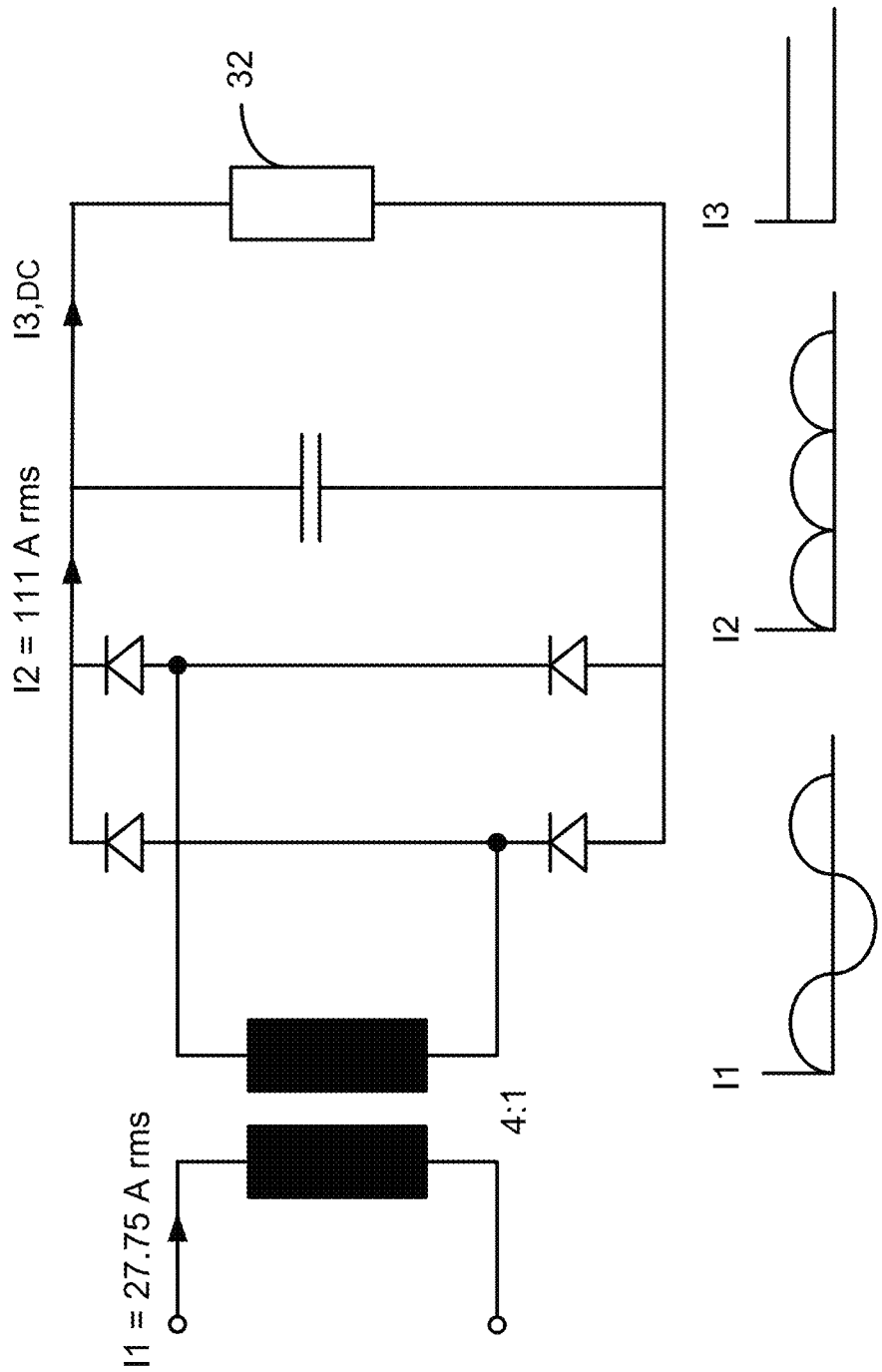
FIG. 13 shows a schematic diagram illustrating different current forms at different stages of a power train as motivation for indirect DC output current measurement according to the present invention.

FIG. 13 shows a schematic diagram illustrating different current forms at different stages of a power train for motivation of indirect DC output current measurement according to the present invention.

As shown in FIG. 13, along the power train the current has different waveforms and related current values. According to FIG. 13 it is assumed that the mobile side AC/DC converter is realized as ideal transformer having a transformer ratio of 4:1.

As shown in FIG. 13, at the input side of the ideal transformer the current I1 is sinusoidal and easy to measure. Also, at the output side of the ideal transformer the current is sinusoidal, however, at a higher current level due to the transformer ratio of 4:1 of the ideal transformer.

As shown in FIG. 13, at the output side of the diode bridge realizing the mobile side AC/DC converter a current I2 is of a rectified sinusoidal form. The smoothing capacitor at the output of the diode bridge acts as a low pass so that finally a DC current I3 is supplied to the load 32. Generally, $I3=I1(2\sqrt{2})/\pi$ applies.

In conclusion, according to the present invention it is suggested to measure the sinusoidal current I1 at a comparatively low current level instead of the DC current I3 at a much higher current level. The is also advantageous in that AC current sensors are cheaper as DC current sensors.

Further, should there be several mobile side output groups where the current needs to be measured a state of the art solution would measure the current at each mobile side output module thus leading to the use of a plurality of current sensors. Optionally, another state of the art solution would be to measure a combined output current leading to the disadvantage hat bulky output cables have to routed through the current sensor. Also, the accuracy would be compromised as the dynamic range of the current sensor would be larger than required for a single output current.

Contrary to that, the approach according to the present invention and as illustrated in FIG. 13 allows to measure the input current I1 and to calculate the DC output current I3 therefrom.

Figure 14:
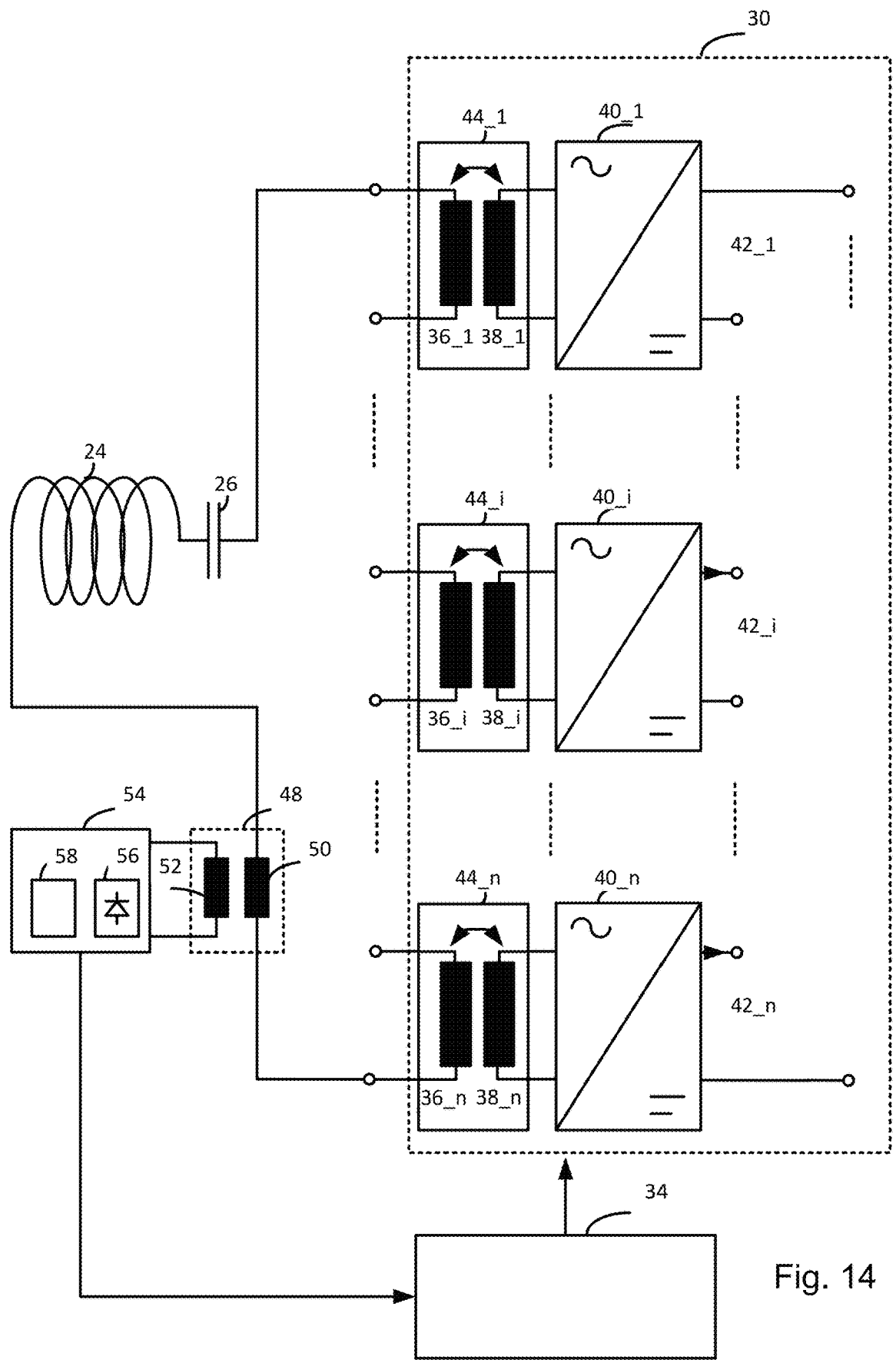
FIG. 14 shows a schematic diagram of a mobile side circuitry of a wireless power transfer system using a current transformer for indirect measurement of a DC output current and subsequent use of the measurement result for control of mobile side rectifier circuits.

FIG. 14 shows a schematic diagram of a mobile side circuitry of a wireless power transfer system using a current transformer for indirect measurement of a DC output current and subsequent use of the measurement result for control of mobile side rectifier circuits.

As shown in FIG. 14, a current transformer 48 having a primary side winding 50 connected between the mobile side resonant circuit and the input of the mobile side transformer stage 30 and a secondary side winding 52 connected to a circuit 54 is adapted to evaluate an output current of a wireless power transfer system.

It should be noted that the concept underlying indirect current measurement according to the present invention is counter intuitive as normally it would be expected that the magnetizing currents of the transformers 44_1, ..., 46_n and 48 as well as losses in the rectifier would make the measurement barely usable. However, these magnetizing currents merely add phase shift but do not have any effect on the accuracy of the output current measurement. This means that in practice that the use of the current transformer 48 allows for a more accurate current measurement than would be possible through use of normal DC current sensors.

Further, it should be noted that the present invention also covers the use of the current transformer 48 for evaluation of an output current of a wireless power transfer system, wherein the current transformer 48 has a primary side winding 50 connected to an input of a mobile side circuitry a wireless power transmission system and a secondary side winding 52 connected to a monitoring circuit 54 adapted to evaluate the output current of a wireless power transfer system.

As shown in FIG. 14, the monitoring circuit 54 for determining an output current of a wireless power transfer system comprises a rectifying circuit 56 connected to the secondary side winding 52 of the current transformer 48. Further, the monitoring circuit 54 comprises an averaging circuit 58 connected to the rectifying circuit 56 which is adapted to determine an average of the output of the rectifying circuit 56 as equivalent to the output current of the wireless power transmission system.

Optionally, the averaging circuit 58 comprises a smoothing capacitor connected to the output terminals of the rectifying circuit 56 and a resistor connected in parallel to the smoothing capacitor.

Operatively and as will be explained in the following, the output of the averaging circuit 58 may be used to control the mobile side AC/DC converters 40_1, ..., 40_n if these are synchronous rectifiers.

Figure 15:
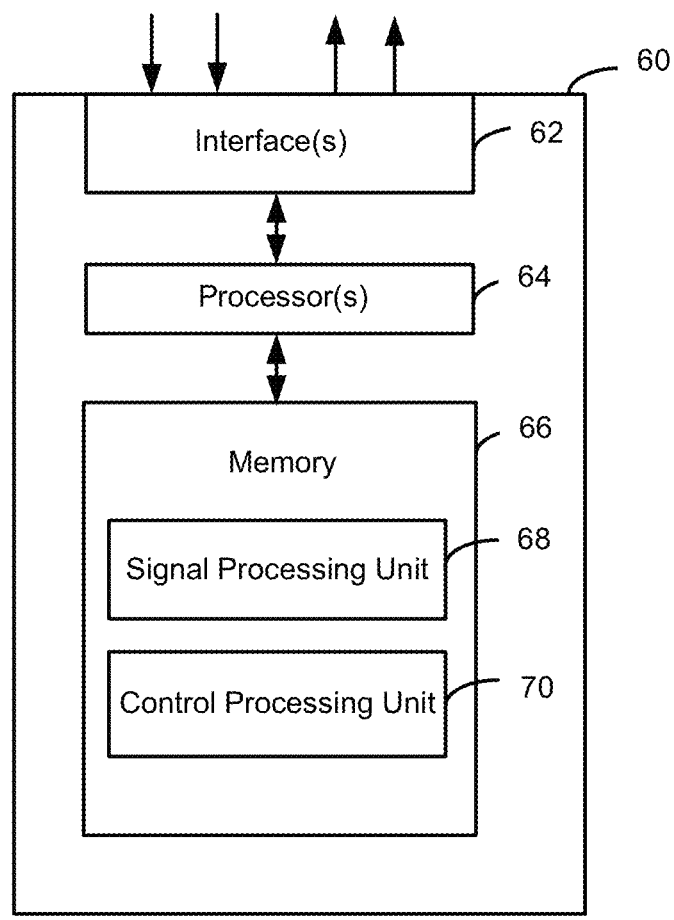
FIG. 15 shows a schematic circuit diagram of a controller apparatus for an inductive power transfer system according to present invention.

FIG. 15 shows a schematic circuit diagram of a controller apparatus 60 for an inductive power transfer system according to present invention.

As shown in FIG. 15, the controller apparatus 60 comprises at least one interface 62, e.g., a radio interface. The interface 62 is suitable for wireless information exchange, e.g., with a remote controller in the inductive power transfer system 10 or with an external control station of the inductive power transfer system 10. In some scenarios, the interface 62 may also be used for exchange of information with external systems, e.g., a maintenance system.

As shown in FIG. 15, the controller apparatus 60 comprises at least one processor 64 coupled to the interface 62 and a memory 66 coupled to the at least one processor 64. The memory 66 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 66 also includes instructions, e.g., suitably configured program code to be executed by the at least one processor 64 in order to implement a later described functionality of the controller apparatus 60. This functionality will be referred to in the following as units. It is noted that these units do not represent individual hardware elements of the controller apparatus 60, but rather represent functionalities generated when the at least one processor 64 execute the suitably configured program code.

As shown in FIG. 15, the memory 66 may include suitably configured program code to implement a signal processing unit 68 and a control processing unit 70.

Operatively, the signal processing unit 68 is adapted to receive an output signal of the current transformer 48 having the primary side winding 48 connected to an input of the mobile side circuitry of the wireless power transmission system, to classify a polarity of the output signal with respect to a reference potential as positive polarity or negative polarity, and to compare the output signal with a threshold value.

Further, operatively the control processing unit 70 is adapted to turn on at least one first switching circuit the at least one mobile side AC/DC converter 40_1, ..., 40_n realized as synchronous rectifier circuit, respectively, when the output signal has positive polarity and the absolute value of the output signal is larger than the threshold value and to turn on at least one second switching circuit of the at least one synchronous rectifier circuit 40_1, ..., 40_n being different from the at least one first circuit when the output signal has negative polarity and the absolute value of the output signal is larger than the threshold value.

It should be noted that according to the present invention the at least one mobile side AC/DC converter may be of any suitable type, e.g., be configured into a full-bridge configuration or a half-bridge configuration.

Here, in the full-bridge configuration there would be provided two first switching elements lying in a first diagonal of the full-bride and two second switching elements lying in a second diagonal of the full-bridge, wherein the second diagonal would be different from the first diagonal.

Alternatively, in the half-bridge configuration there would be provided one first switching element lying in an upper part of the half-bridge and one second switching element lying in a lower part of the half-bridge.

Figure 16:
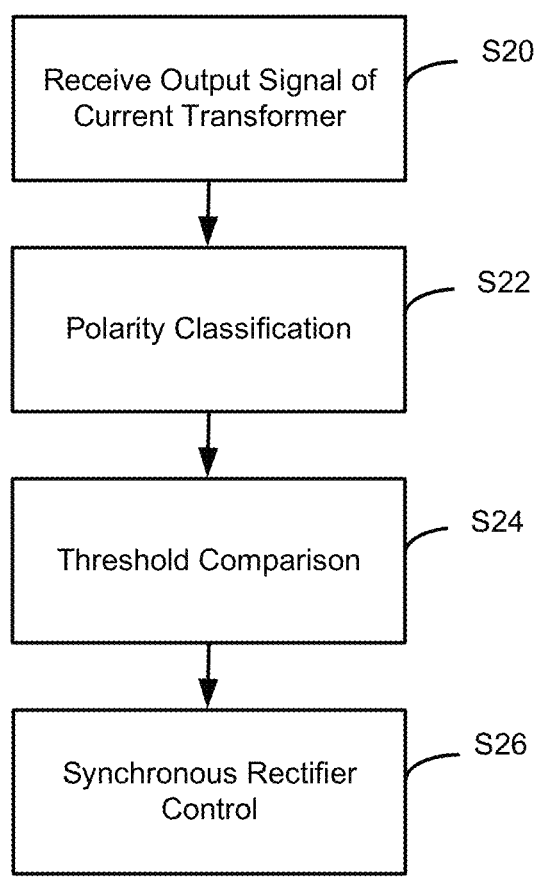
FIG. 16 shows a flowchart of operation for the controller apparatus shown in FIG. 15.

FIG. 16 shows a flowchart of operation for the controller apparatus 60 shown in FIG. 15.

As shown in FIG. 16, operatively the interface 62, in cooperation with the processor 64, is adapted to execute a step S20 for receiving an output signal of a current transformer 48 having the primary side winding 50 connected to an input of the mobile side circuitry of a wireless power transmission system.

As shown in FIG. 16, operatively the signal processing unit 68, in cooperation with the processor 74, is adapted to execute a step S22 for classifying a polarity of the output signal with respect to a reference potential as positive polarity or negative polarity.

As shown in FIG. 16, operatively the control processing unit 70, in cooperation with the processor 64, is adapted to execute a step S24 for comparing the output signal with a threshold value.

As shown in FIG. 16, operatively the control processing unit 70, in cooperation with the processor 64, is adapted to execute a step S26 for turning on at least one first switching circuit of the at least one mobile side AC/DC converter 40_1, ..., 40_n being a synchronous rectifier circuit when the output signal has positive polarity and an absolute value of the output signal is larger than the threshold value and for turning on at least one second switching circuit of the at least one synchronous rectifier circuit 40_1, ..., 40_n being different from the at least one first switching circuit when the output signal has negative polarity and the absolute value of the output signal is larger than threshold value.

It should be noted that the operation as shown in FIG. 16 is not restricted to a realization using the controller apparatus as shown in FIG. 15. Alternatively, the method may be realized in an analogue manner using comparator circuits for classification and threshold comparison as outlined above. Then the output put of the comparators would be used as inputs to analogue gate driver circuits that drive the switching circuits of the at least one mobile side AC/DC converter 40_1, ..., 40_n.

While in the above, the present invention has been described with reference to the drawings and figures of preferred embodiments or examples of the invention, it should be noted that clearly the present invention may also be implemented using variations and modifications thereof which will be apparent and can be readily made by those skilled in the art without departing from the scope and spirit of the present invention. E.g., functionalities described above may be realized in software, in hardware, or a combination thereof.

Accordingly, it is not intended that the scope of claims appended hereto is limited to the description as set forth herein, but rather that the claims should be construed so as to encompass all features of presentable novelty that preside in the present invention, including all features that would be treated as equivalent thereof by those skilled in the art to which the present invention pertains.

The invention claimed is:

1. Mobile side circuitry of a wireless power transmission system, comprising:
 a mobile side resonant circuit adapted to inductively couple the mobile side circuitry to a stationary side circuitry of the wireless power transmission system;
 a mobile side rectifier stage adapted to rectify an input signal for supply of power to a mobile side load; and
 a mobile side transformer stage directly connected at its input side to the mobile side resonant circuit and connected at its output side to the mobile side rectifier stage; wherein
 the mobile side transformer stage comprises a same number $n>1$ of primary side windings and secondary side windings;
 the mobile side rectifier stage comprises one mobile side AC/DC converter connected to each secondary side winding; wherein
 the mobile side AC/DC converters are realized as synchronous rectifier circuits which are controlled according to a DC output current being measured indirectly through measurement of an input side current of the mobile side rectifier stage; and
 output terminal pairs of the plurality of mobile side AC/DC converters are connected in series or output terminal pairs of the plurality of mobile side AC/DC converters are connected in parallel or mobile side AC/DC converters are grouped into a plurality of mobile side output groups such that output terminal pairs within each mobile side output group are connected in series and output terminal pairs of different mobile side output groups are connected in parallel.

2. Mobile side circuitry according to claim 1, wherein
 the number of mobile side output group(s) is $g \geq 1$;
 the number of mobile side AC/DC converter(s) per mobile side output group is $1 \leq r \leq n$;
 output terminal pairs of mobile side AC/DC converters in each mobile side output group are connected in series if $r>1$; and
 output terminal pairs of the mobile side groups are connected in parallel if $g>1$.

3. Mobile side circuitry according to claim 2, wherein $g=1$ and $n=r>1$.

4. Mobile side circuitry according to claim 2, wherein $g=n>1$ and $r=1$.

5. Mobile side circuitry according to claim 2, wherein $1<g<n$, $n \bmod g = 0$, and $r>1$.

6. Mobile side circuitry according to claim 4, wherein $n=2^i$, $i=1, 2, 3, \ldots$,
 and $g=2^j$, $0 \leq j \leq i-1$.

* * * * *